(12) United States Patent
Lambrecht et al.

(10) Patent No.: US 12,305,977 B2
(45) Date of Patent: May 20, 2025

(54) DEVICE FOR DETECTING AND IDENTIFYING PLAY IN VEHICLES

(71) Applicant: PDT ENGINEERING BVBA, Destelbergen (BE)

(72) Inventors: Johan Lambrecht, Bassevelde (BE); Willy Lambrecht, Destelbergen (BE)

(73) Assignee: PDT ENGINEERING BVBA, Destelbergen (BE)

( * ) Notice: Subject to any disclaimer, the term of this patent is extended or adjusted under 35 U.S.C. 154(b) by 328 days.

(21) Appl. No.: 18/025,147

(22) PCT Filed: Sep. 6, 2021

(86) PCT No.: PCT/IB2021/058091
§ 371 (c)(1),
(2) Date: Mar. 7, 2023

(87) PCT Pub. No.: WO2022/049553
PCT Pub. Date: Mar. 10, 2022

(65) Prior Publication Data
US 2023/0324162 A1 Oct. 12, 2023

(30) Foreign Application Priority Data
Sep. 7, 2020 (BE) .................... 2020/5613

(51) Int. Cl.
*G01B 5/255* (2006.01)
*G01B 5/14* (2006.01)

(52) U.S. Cl.
CPC .................... *G01B 5/146* (2013.01)

(58) Field of Classification Search
CPC ................. G01B 5/146; G01B 5/255
(Continued)

(56) References Cited

U.S. PATENT DOCUMENTS

| 1,717,131 A | * | 6/1929 | Weaver | G01B 5/255 |
| | | | | 33/203.14 |
| 2,508,849 A | * | 5/1950 | Williams | G01B 5/255 |
| | | | | 33/203.15 |

(Continued)

FOREIGN PATENT DOCUMENTS

| DE | 10217720 C1 | 12/2003 |
| EP | 0011100 A1 | 5/1980 |

(Continued)

OTHER PUBLICATIONS

International Search Report and Written Opinion for PCT/IB2021/058091, mailing date of Dec. 23, 2021.

*Primary Examiner* — George B Bennett
(74) *Attorney, Agent, or Firm* — FRESH IP PLC; Clifford D. Hyra; Aubrey Y. Chen

(57) ABSTRACT

The present disclosure relates to a device for detecting and identifying play and checking the attachment of wheel, steering-assembly and suspension parts of vehicles. The device includes a linearly displaceable carriage and a supporting plate which is configured to support a wheel of a vehicle. The supporting plate is rotatable, and the carriage is displaceable with respect to the supporting plate in a direction corresponding to the transverse direction of the vehicle. Additionally, the carriage includes a rotatable structure which is configured to rotate the supporting plate about an axis of rotation.

10 Claims, 4 Drawing Sheets

(58) Field of Classification Search
USPC .............................. 33/203.11, 203.12, 203.13
See application file for complete search history.

(56) References Cited

U.S. PATENT DOCUMENTS

| | | | | |
|---|---|---|---|---|
| 3,823,485 | A | | 7/1974 | Lambrecht et al. |
| 4,966,376 | A | | 10/1990 | Scheper |
| 5,303,035 | A | * | 4/1994 | Luecke ................ G01B 5/0004 108/138 |
| 5,569,836 | A | * | 10/1996 | Hill ....................... G01M 17/06 73/116.01 |
| 5,739,427 | A | * | 4/1998 | Yamaya ............ G01M 17/0072 73/115.07 |
| 5,811,657 | A | * | 9/1998 | Fagerdahl ............. G01M 17/06 73/11.04 |
| 6,058,614 | A | * | 5/2000 | Shibayama ........... G01M 17/04 33/645 |
| 6,499,347 | B1 | * | 12/2002 | Kugel ..................... B60T 1/065 33/336 |
| 7,066,439 | B2 | * | 6/2006 | Lambrecht ............ G01B 5/255 269/73 |
| 7,143,519 | B2 | * | 12/2006 | Jackson ............ G01B 11/2755 33/203 |
| 2007/0289151 | A1 | * | 12/2007 | Doan .................... G01B 5/255 33/203 |
| 2020/0216297 | A1 | * | 7/2020 | Rossato ................ G01M 17/02 |

FOREIGN PATENT DOCUMENTS

| | | |
|---|---|---|
| WO | WO 96/07884 A1 | 3/1996 |
| WO | WO 2011045664 A1 | 4/2011 |

\* cited by examiner

X (mm)

X (mm)

DEVICE FOR DETECTING AND IDENTIFYING PLAY IN VEHICLES

This application is a National Phase entry of International Application No. PCT/IB2021/058091 under § 371 and claims the benefit of Belgian Patent Application No. BE2020/5613, filed Sep. 7, 2020, which is hereby incorporated by reference in its entirety.

FIELD OF THE INVENTION

The present disclosure relates, on the one hand, to a device for detecting play and checking the attachment of wheel, steering-assembly and suspension parts of vehicles, comprising a linearly displaceable carriage and a rotatable supporting plate which is configured to support a wheel of a vehicle, such as for example a passenger car or lorry, trailer or airplane, wherein said carriage is displaceable with respect to the supporting plate in a direction corresponding to the transverse direction of the vehicle, wherein the carriage comprises a rotatable structure which is configured to rotate the supporting plate about an axis of rotation. On the other hand, the present disclosure relates to a system, in particular a measuring system, for detecting play and checking the attachment of wheel, steering-assembly and suspension parts of vehicles, comprising at least two such devices.

The present disclosure relates in particular to a device which is suitable for detecting (recording) and identifying play of parts which are susceptible to wear in a more rational and high-quality manner. Examples of connection-technical parts are: wheel bearings, steering joints and suspension arms and vibration dampers (silent blocks) of a single-axle or multi-axle vehicle. More specifically, this relates to parts which are susceptible to play which are directly or indirectly connected to a wheel and which negatively affect the steering and driving stability and thus have an impact on safety.

BACKGROUND

The term play is interpreted in the automotive industry, for example in garages and specialist test centres, as the relative play of a part, with a distinction being made between original and non-original play by visual assessment.

Steering-assembly and suspension parts of vehicles are mechanically coupled to a wheel and may, due to wear, cause various kinds of play on a wheel, which types of play can be located in a three-dimensional space as follows:

play in the longitudinal direction (X): this direction coincides with the axis of symmetry of a vehicle;
play in the transverse direction (Y): this direction is at right angles to the longitudinal direction;
play along an upward and downward movement (Z) of a wheel;
play in a differentiated direction using a combination of X, Y and Z as reference.

There is a causal connection between the play on a wheel and the play of these parts. A deviation from the normal geometrical position of a wheel is proportional to the magnitude of the play of these parts.

Until now, rejection or replacement of a part due to visible play has often depended on the subjective opinion of the technician who carries out the assessment and the visual limitation posed by covered parts. In this case, use can be made of a play detector. Apparatuses of this type, the operational principle of which is based on movable plates onto which the wheels of a vehicle to be checked are placed and which are movable to and fro in a direction corresponding to the transverse direction or longitudinal direction of the vehicle, are known and are described, inter alia, in Belgian patent BE 772697 and European patent EP 1 327 117 in the name of the Applicant of the present patent application.

However, it has been found in practice that this generation of apparatuses is no longer adequate when investigating play in steering-assembly and suspension parts since the steering system and stability of a vehicle has to meet increasingly higher road traffic demands. The reason for this is that the mechanical connection between the wheel and the chassis in the higher-priced vehicle segment has evolved to a more complex geometrical arrangement of ball joints, rods, arms and rotation points. Furthermore, it is found that, both at national and international level, the authorized test centres for vehicles, the car service branch, and the official authorities, are demanding more uniformity and professionalism in the field of investigating play.

A number of years ago, the patentee was granted a European patent EP 2 488 823 (WO 2011/045664) for a play detector in the form of a 3D wheel manipulator. This play detector comprises support means which can generate a movement in three directions (X, Y, Z) exerted on a wheel. The respective support means comprise a transmission member (transmission) in the form of a carriage which is movable in a first longitudinal direction (X) parallel to the axis of symmetry of a vehicle and which is provided with wheel-clamping means which move, according to a superposition, in a second direction (Y) directed to a wheel of the carriage and move in a third direction (Z) which lifts a wheel of the carriage. The lifting activation is thus proportional to a function of the transverse activation. Such a device can exert different (three-dimensional) forces on a wheel of a vehicle. However, the respective play detector has the drawback that it cannot be used to check vehicles having a different track width, i.e. the distance between two wheels on the same axle, for measurement purposes. In addition, it has been found that it is difficult to incorporate a suitable measuring system which is able to record play.

European patent publication EP 0 011 100 describes a device which is used to determine the play between parts of the wheel suspension and the steering in a motor vehicle, in which only one single supporting plate is used to drive a wheel which has been arranged thereon in opposite directions, while the other wheel on the vehicle axle is supported in a fixed manner.

American patent publication U.S. Pat. No. 4,966,376 and the International patent publication WO 96/07884 also describe a device for inspecting the attachment of wheel, steering-assembly and suspension parts of a vehicle.

SUMMARY

It is therefore an object of the disclosure to provide a device for detecting and identifying play by means of which it is possible to detect play in a quantitative manner, irrespective of the track width, the wheel diameter and/or tyre width of the vehicle to be checked. An additional object of the present disclosure is to create a device by means of which the play can be recorded, preferably by directly positioning two wheels of the same axle on the device, and in particular without having to connect additional auxiliary means.

The object of the disclosure is achieved by providing a device for detecting and identifying play and checking the attachment of wheel, steering-assembly and suspension parts of vehicles, comprising a linearly displaceable carriage and a rotatable supporting plate which is configured to support a wheel of a vehicle, wherein said carriage is displaceable with respect to the supporting plate in a direction corresponding to the transverse direction of the vehicle, wherein the carriage comprises a rotatable structure which is provided to rotate the supporting plate about an axis of rotation, wherein the rotatable structure comprises a rotatable axle and a transmission mechanism configured to transmit the rotating movement of the axle to the supporting plate, the device furthermore comprises first and second guide means in which said carriage is linearly displaceable, wherein the first guide means are provided on a structure located underneath and wherein the second guide means are provided on the underside of the supporting plate, wherein the transmission mechanism comprises a transmission element connected to the rotatable axle and comprises at least one guide element which is provided on the transmission element and which is displaceable in the second guide means, and the device comprises a first and second drive means, wherein the first drive means is configured to displace said carriage with respect to the supporting plate and wherein the second drive means is configured to rotate the rotatable axle in a clockwise and/or counterclockwise direction. Such a device offers the advantage that the functionality thereof is compatible with a measuring system to record play.

With the device according to at least one embodiment of the disclosure, in a first preferred embodiment, the supporting plate remains at a fixed position where the supporting plate is rotatable, but not linearly displaceable in a direction corresponding to the transverse direction of the vehicle. It is the carriage which will move with respect to this supporting plate. As a result thereof, the carriage can position itself on the basis of the track width of a carriage to be checked. Once it is in position, the supporting plate can be rotated in order to start detecting any (possible) play.

In a second preferred embodiment, the supporting plate is linearly displaceable from a fixed position in the transverse direction. In order to achieve this, the displacement of the second guide means of the device is mechanically blocked, so that the supporting plate follows the linear displacement of the first guide means.

The supporting plate is preferably made of metal. The supporting plate has a top surface and bottom surface, with the top surface forming the support surface for a wheel of a vehicle to be checked. The support surface is preferably provided with a suitable material surface with a high coefficient of friction. In a preferred embodiment, the supporting plate has a V-shaped cross section in order to achieve optimum positioning of a wheel. The V-shaped cross section offers the advantage that wheels can be centred on the supporting plate, irrespective of their diameter. In an alternative embodiment, the supporting plate may comprise a recess which can form an optimum contact surface for a vehicle wheel. Another possibility is to develop an embodiment in which an additional degree of freedom is added in order to linearly displace the supporting plate in a direction corresponding to the longitudinal direction of the vehicle.

In order to check the wheels of a vehicle for play preferably two devices according to the disclosure are used, in particular a left-hand and right-hand device, spaced apart, preferably symmetrically, in order thus to check the front and rear wheels of a vehicle. The respective distance is chosen such that a minimum and/or maximum track width can be accommodated. Two such devices form a system for detecting and identifying play. In a preferred embodiment, the supporting plate comprises one or more pressure sensors, preferably two pressure sensors per supporting plate, in order to determine the position of a wheel arranged on the supporting plate. In an alternative embodiment, the position of a wheel arranged on the supporting plate can be determined by means of an optical camera.

In a preferred embodiment of the device according to the disclosure, said carriage is displaceable to a first position in which the rotatable structure is rotatable about a first axis of rotation which extends through the centre of the projection of a wheel on the support surface of the supporting plate.

In a more preferred embodiment of the device according to the disclosure, said carriage is displaceable to a second position in which the rotatable structure is rotatable about a second axis of rotation which is eccentric with respect to the first axis of rotation.

By means of the device, the play can also be measured and recorded. In a particular embodiment, the device to this end comprises the first measuring means to determine the rotation of the supporting plate, and second measuring means to measure the generated rotation force, and the device is configured to indicate play on the basis of the signals generated by the measuring means. To this end, the device preferably comprises a processing unit which is suitable for the purpose and which can convert the generated signals which can be visualised on a display unit in the form of a diagram which plots the generated rotation force against the displacement. In this way, it becomes possible to create an objective indication system which is able to determine if there is actual play. The end result of a measurement is based on a risk analysis. Such devices can be installed in particular in car test centres and garages, making it possible to perform targeted maintenance of steering-assembly and suspension parts in case play is detected.

According to a more particular embodiment of the device according to the disclosure, said carriage comprises a 4-point bearing for supporting the rotatable structure. A 4-point bearing or slew ring bearing will absorb the generated axial and radial forces.

The device comprises first and second guide means in which said carriage is linearly displaceable, the first guide means being provided on a structure situated underneath and the second guide means being provided on the underside, preferably against the bottom surface, of the supporting plate. Preferably, the structure situated underneath is a base plate, e.g. made of aluminium, which also forms part of the device.

The first guide means preferably comprise two parallel straight guide rails which extend in a direction corresponding to the transverse direction of the vehicle which is to be checked for play. Said carriage is movable to and fro in the respective guide means. In a preferred embodiment of the device according to the disclosure, the carriage to this end comprises at least one guide profile which is displaceable in the first guide means. The respective guide profile preferably has a C-shaped cross section. Preferably, the carriage comprises two parallel guide profiles which slide across or in the above-described guide rail. In order to ensure accurate guiding performance, the guide rails will have a shape which is suitable for accommodating the guide profiles.

With the device according to the disclosure, the transmission mechanism comprises a transmission element connected to the rotatable axle and at least one guide element which is provided on the transmission element and which is displaceable in the second guide means. During a rotation of the rotatable axle, the at least one, preferably two, guide element(s), will co-rotate. Since, in a preferred embodiment, said guide element comprises a guide part which is configured to move linearly in the second guide means, and the guide part furthermore comprises an engagement part which is configured to engage with the second guide means, a rotation of the rotatable axle will result in a rotation of the supporting plate. If the carriage is displaced and the guide means under the supporting plate are blocked, the supporting plate will move linearly in the transverse direction.

The device according to at least one embodiment of the disclosure comprises a first and second drive means, the first drive means being configured to displace said carriage with respect to the supporting plate and the second drive means being provided to rotate the rotatable axle in a clockwise and/or counterclockwise direction. Preferably, said drive means are electromechanical, pneumatic and/or hydraulic drive means.

The present disclosure also relates to the use of the device as described in the claims to detect and/or indicate the play in one or more parts of wheel, steering and suspension of one or several wheels of a vehicle and/or airplane.

The present disclosure furthermore relates to a system for detecting and identifying play and checking the attachment of wheel, steering-assembly and suspension parts of vehicles, comprising a first and a second device, the device as described in the claims, wherein the supporting plate of the first device is configured to support a left-hand wheel of a vehicle, and wherein the supporting plate of the second device is configured to support a right-hand wheel of a vehicle.

BRIEF DESCRIPTION OF THE DRAWINGS

In order to further explain the properties of the present invention and to indicate additional advantages and features thereof, there now follows a description of the device according to the invention. It will be clear that none of the below description may be interpreted as constituting a limitation of the scope of protection defined in the claims.

Reference numerals are used in this description to refer to the attached drawings, in which.

DETAILED DESCRIPTION

In order to be able to successively check the wheels (17) of vehicles having different track widths for play, the present disclosure provides a system (15) which is suitable for detecting and identifying play and checking the attachment of wheel, steering-assembly and suspension parts of vehicles.

Figure 1:
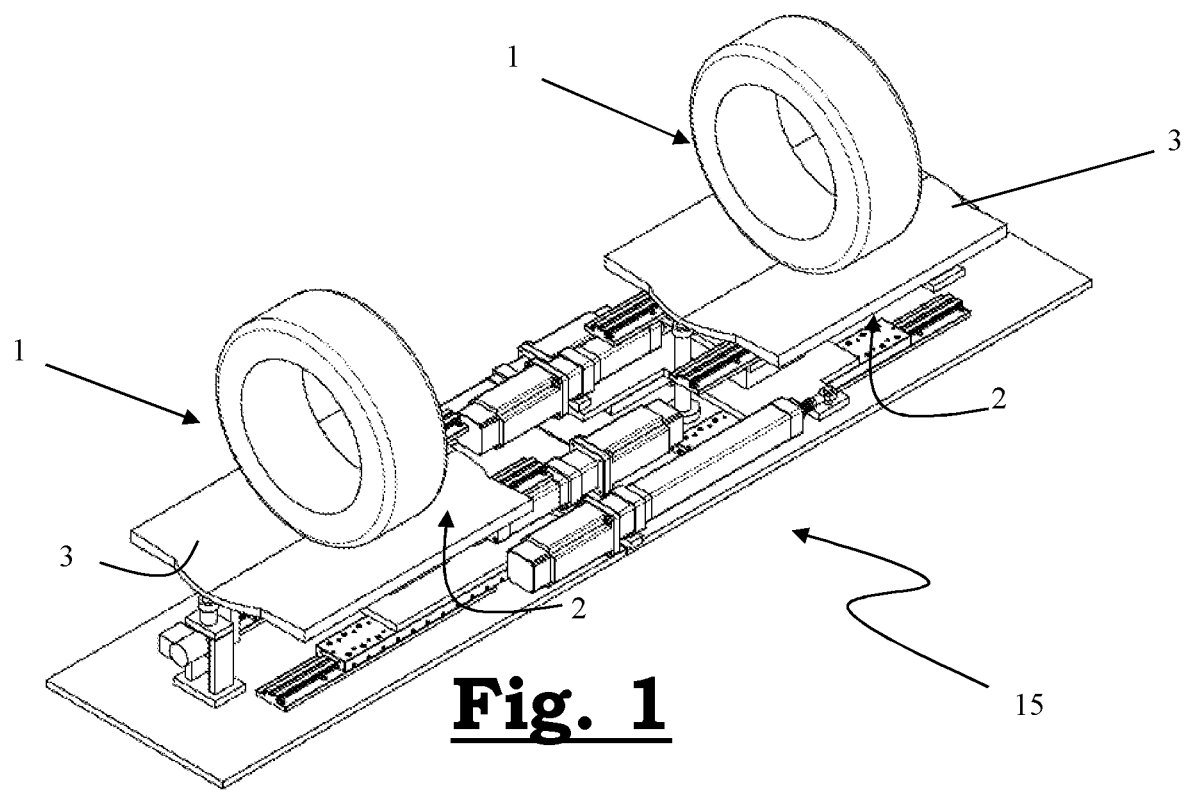
FIG. 1: shows a perspective view of a system for detecting and identifying play, composed of two mutually symmetrical devices according to at least one embodiment of the disclosure.
Figure 2:
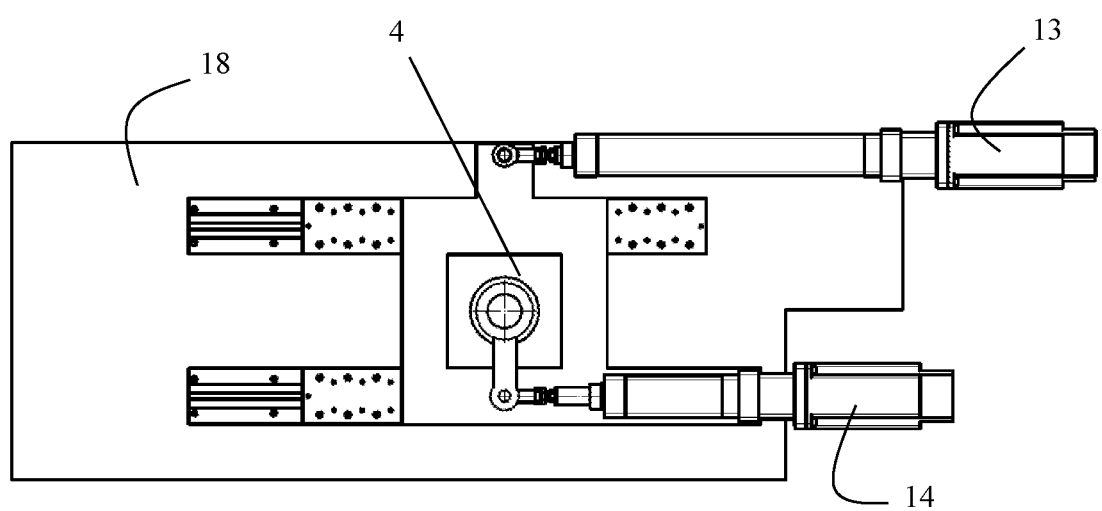
FIG. 2: shows a horizontal cross section of a portion of the device according to at least one embodiment of the disclosure.

Such a system (15) is represented in FIG. 1 and is composed of two similar devices (1) which also form part of the subject matter of the present disclosure. One device (1) is used to check the left-hand wheel (17) for play, while the other device (1) is used to check the right-hand wheel (17) for play. In the following description, the device (1) used is discussed in greater detail.

Figure 3:
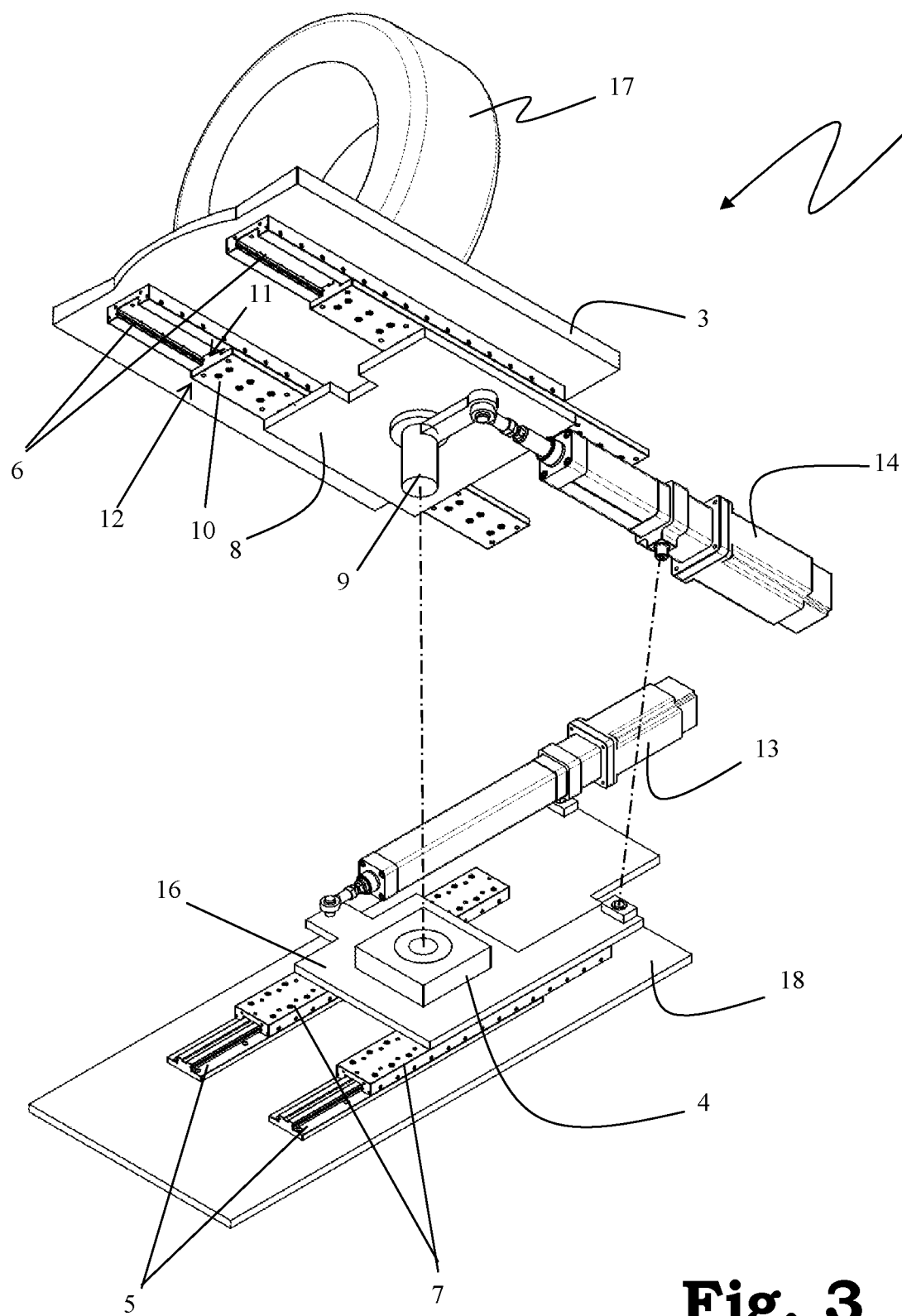
FIG. 3: shows a representation of the device according to at least one embodiment of the disclosure, in which the supporting plate with rotatable structure has been detached from the 4-point bearing.

The device (1) according to the disclosure, which is represented in FIG. 3, comprises a linearly displaceable carriage (2) and a rotatable supporting plate (3) which is configured to support a wheel (17) of a vehicle. The carriage (2) is displaceable with respect to the supporting plate (3) in a direction corresponding to the transverse direction of the vehicle.

The carriage (2) is linearly displaceable in the so-called first (5) and second (6) guide means. The first guide means (5) are provided on a base plate (18), e.g. made of aluminium. Obviously, the first guide means (5) may also be placed against a different structure (situated underneath), such as e.g. a ground surface. With the illustrated device, the first guide means comprise two parallel straight guide rails which extend in a direction corresponding to the transverse direction of the vehicle which is to be checked for play. Said carriage is movable to and fro in the respective guide means. To this end, the carriage (2) comprises two parallel guide profiles (7) with a preferably C-shaped cross section which slide over or in the guide rails. For good guidance, the guide rails have a shape which is suitable for accommodating the guide profiles (7).

The second guide means (6) are provided against the bottom surface of the supporting plate (3). The second guide means are designed as straight guide rails which extend in a direction corresponding to the transverse direction of the vehicle which is to be checked for play. The respective guide rails preferably have a C-shaped cross section.

The top surface of the supporting plate (3) forms the support surface for the wheel to be checked. In order to achieve an accurate positioning of the wheels, a V-shaped wheel well is provided on the supporting plate. The two sides of the wheel well are provided with grip strips. Obviously, instead of providing the supporting plate with a wheel well, the supporting plate may be given a shape such that a wheel well forms an integral part of the supporting plate. The supporting plate (3) is made of metal, preferably stainless steel. The dimensions of the supporting plate (3) depend on the type of vehicle (e.g. passenger car or lorry). Thus, the supporting plate for a passenger car may have the following dimensions: 750 mm×400 mm×20 mm (L×W×D). The supporting plate (3) is also provided with one or more sensors, preferably pressure sensors, in order to determine the position of the wheel (17) on the supporting plate (3). Another option to determine the position of the wheel (17) on the supporting plate (3) is to use an optical camera.

The check for play is performed by first rotating the supporting plate (3). With regard to concentric and eccentric activation in a support surface of a wheel. In order to be able to rotate the supporting plate (3), the carriage (2) comprises a rotatable structure, in particular a slew ring bearing, which is configured to rotate the supporting plate (3) about an axis of rotation. The rotatable structure comprises a rotatable axle (9) and a transmission mechanism (8; 10) which is configured to transmit the rotating movement of the axle (9) to the supporting plate (3).

The transmission mechanism is composed of a transmission element (8). In the illustrated device, the transmission element (8) is of a plate-shaped design and is provided with an opening with which the end of the rotatable axle (9) engages. Consequently, rotation of the axle (9) will result in a rotation of the transmission element (8). The transmission element (8) is also provided with two guide elements (10) which are arranged so as to be displaceable in the second guide means (6), in particular the guide rails which are provided on the underside of the supporting plate (3). The respective guide elements (10) have a guide part (11) which is configured to move linearly in the second guide means and, in addition, have an engagement part (12) which is configured to engage with the second guide means.

Therefore, during a rotation of the rotatable axle (9), the guide elements (10) arranged on the transmission element (8) will also co-rotate. Since some of the guide elements (10), in particular the engagement part (12), engage with the second guide means which are provided on the supporting plate, a rotation of the rotatable axle (9) will result in a rotation of the supporting plate (3).

The rotatable axle (9) is rotatable in a clockwise or counterclockwise direction. The rotatable axle (9) will be rotated by means of a second drive means (14). The device (1) also has a first drive means (13) to displace the carriage (2) with respect to the supporting plate (3). Said drive means are preferably electromechanical, pneumatic and/or hydraulic drive means.

The rotatable axle (9) is mounted in a 4-point bearing (4) which will absorb the generated axial and radial forces. As can be seen in FIG. 3, the 4-point bearing (4) is fitted on a movable mounting plate (16) which also forms part of the movable carriage (2). The first drive means engages with the mounting plate (16).

Figure 4:
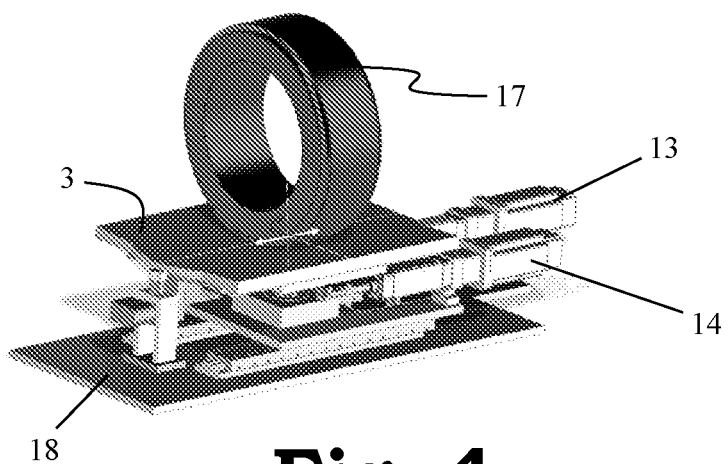
FIG. 4: shows a perspective view of the device according to at least one embodiment of the disclosure, in which the carriage is in its first concentric position in which the axis of the rotation axle extends through the centre of the projection of the wheel on the support surface of the supporting plate.
Figure 5:
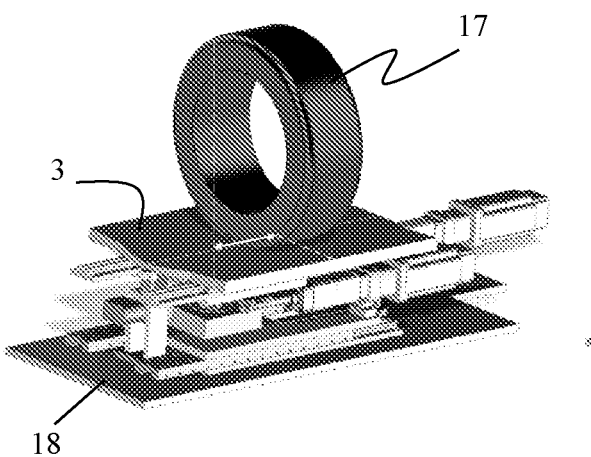
FIG. 5: shows a perspective view of the device according to at least one embodiment of the disclosure, in which the carriage is in its second eccentric position.
Figure 6:
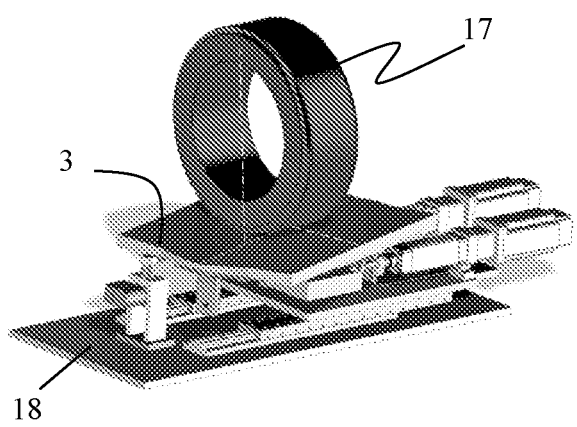
FIG. 6: shows a perspective view of the device illustrated in FIG. 5, in which the supporting plate has performed a rotating movement.

Due to the fact that the carriage (2) is displaceable, it is also possible to displace the axis of rotation. Thus, said carriage (2) is displaceable, for example, to a first position (concentric position), illustrated in FIG. 4, in which the rotatable structure is rotatable about a first axis of rotation which extends through the centre of the projection of a wheel (17) on the support surface of the supporting plate (3) or said carriage can be moved to a second position, illustrated in FIG. 5, in which the rotatable structure is rotatable about a second axis of rotation which is eccentric with respect to the first axis of rotation.

Which parts of the vehicle are checked for play is determined by the position of the carriage. In the first position of the carriage (2), the wheel bearings, steering mechanism, ball joints will be checked, while the rotation points, silent blocks and also the ball joints can be checked when the carriage (2) is in the second position.

Once the wheel of a vehicle to be checked is arranged on the supporting plate, the carriage (2) which is situated under the supporting plate will start to move until it reaches the desired position. The positioning of the carriage (2) will be carried out based on, on the one hand, the track width of the vehicles to be checked and, on the other hand, based on which check (concentric or eccentric) is to be performed. Using the device (1) according to the disclosure, it is possible to subject a wheel to various inspections (methodologies). A number of possible methodologies are discussed below for illustrative purposes:

One possible option of methodically investigating vehicle parts for play is determined by making the supporting plates of the left-hand and right-hand devices perform rotating movements, in a clockwise and counterclockwise direction, in the support surface of the wheels of the same axle.

A first option to perform specific investigations into play on wheel attachment, wheel bearings, subframe, steering-assembly and suspension parts. Wherein the carriage (2) of the device (1) is arranged concentrically and this positioning also coincides with the centre of the wheel contact surface. The methodology is characterized by applying a proportional increase in force to parts, from minimum to maximum load, as soon as the supporting plates (3) of the device (1) are activated. This investigation into play is performed both braked and non-braked.

The supporting plates (3) of both devices (1) rotate simultaneously in a clockwise and counterclockwise direction, with the left-hand and right-hand supporting plates of the system moving to and fro, but rotating in the opposite direction, towards each other and away from each other.

The repeating activation process is built up progressively in a controlled and structured manner via periodisation. The steering-assembly and wheel suspension parts are proportionally subjected to load. As soon as the supporting plates of the device move, forces are generated in the support surface of the wheel. During the investigation, the force is built up until the maximum load is reached.

If a force interval occurs during the investigation procedure, the rotating movement cycle which was programmed originally will stagnate and automatically change into a repeating oscillating reciprocating limited cycle. During the cycle, the data indicators force and play (side slip angle) are recorded.

A second option for performing investigations into play on parts as listed under option 1, more specifically the option to investigate the play effect and the correlation between the left-hand and right-hand wheel (17) of the same axle with regard to wheel deflection and side slip angle. Wherein the carriage (2) of the device (1) is positioned concentrically and this positioning also coincides with the centre of the wheel contact surface.

The supporting plates (3) of both devices (1) rotate in a clockwise and counterclockwise direction, on the one hand, the supporting plates (3) will move to and fro simultaneously, but rotate in opposite direction, towards each other and away from each other and, on the other hand, the possibility of moving independently from each other. This investigation into play is performed braked. The methodology is characterized by comparing the side slip angles of the left-hand and right-hand wheel (17) with each other at maximum rotation load.

The steering-assembly and wheel suspension parts are subjected to maximum load.

A third option of performing investigations into play on parts as listed under option 1, to perform targeted investigations into play on silent blocks, subframe, ball joints, suspension parts. Wherein the carriage (2) of the device (1) is positioned eccentrically with respect to the centre of the wheel contact surface. This results in a wheel activation in the longitudinal direction. The methodology is characterized by proportionally increasing a force on parts, from minimum to maximum load, as soon as the supporting plates (3) of the device (1) are activated. This investigation into play is only performed in the braked condition. During the cycle, the data indicators force and play (wheel displacement angle, being perpendicular to the side slip angle) are recorded.

A fourth option to perform investigations into play on parts as listed under option 2 to perform specific investigations into play on silent blocks. Wherein the carriage (2) of the device (1) is positioned eccentrically with respect to the centre of the wheel contact surface. The methodology is characterized by comparing the wheel displacement angles of the left-hand and right-hand wheel (17) in the braking direction with each other at identical eccentric rotation load. This investigation into play is only performed in the braked condition.

A fifth option to perform an investigation into play on parts as listed under option 1, more specifically to perform investigations into play on ball joints. Wherein the device (1) provides a transverse activation (transverse displacement) of the supporting plate (3). In this case, guide element (10) is mechanically blocked by the second guide means (6).

Using the above-described methodologies, it is possible to detect and record any possible play. By synthesizing the slip/play curve and risk analysis, the effect of the play on the steering and driving stability of the vehicle is determined as safe or unsafe.

By means of the device (1), it is also possible to measure and record the play. To this end, the device comprises first measuring means to determine the rotation and the transverse displacement of the supporting plate, and second measuring means to measure the generated rotation force and/or transverse force, and the device is configured to indicate play on the basis of the signals generated by the measuring means. To this end, the device preferably comprises a processing unit which is suitable for the purpose and which can convert the generated signals which can be visualised on a display unit in the form of a diagram which plots the generated rotation force versus the displacement. This makes it possible to achieve an objective indication system by means of which play can be detected in a concrete way. Such devices can be placed in particular in car test centres and garages, making it possible to perform targeted maintenance of steering-assembly and suspension parts in case play is detected.

By means of the device (1) and, by extension, the system according to the disclosure, it is possible to objectively, numerically and/or graphically identify a variation in the wheel direction (inter alia side slip angle), which is proportional with wheel play, measured in a support surface of a wheel.

Figure 7:
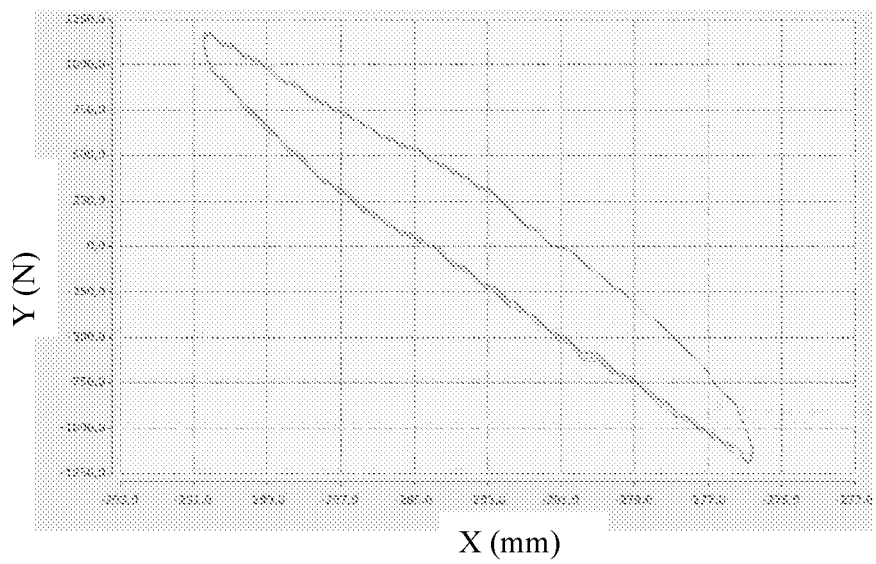
FIG. 7: shows a graphic representation of a performed investigation into play on steering-assembly parts without play.
Figure 8:
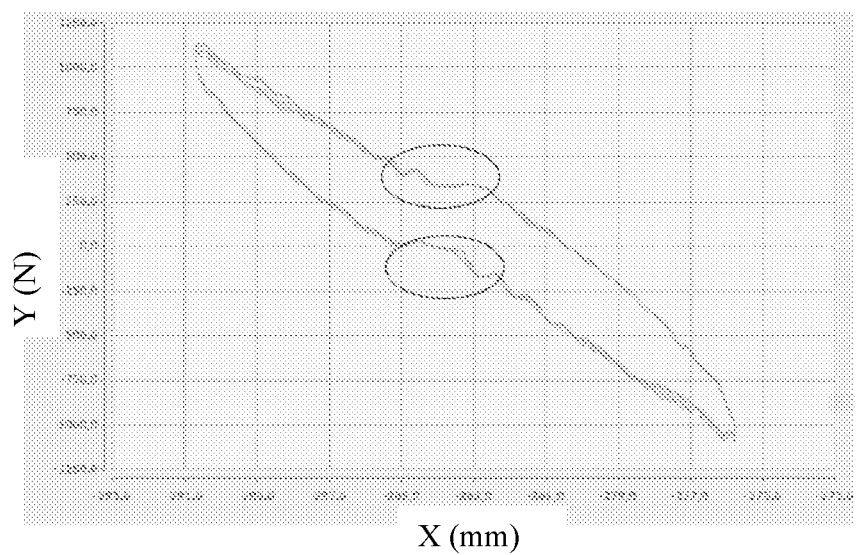
FIG. 8: shows a graphic representation of a performed investigation into play on steering-assembly parts with play.

In a test stage, an investigation into play was performed corresponding to the above-described option 1, in which initially steering-assembly parts, which were known not to suffer from play, were subjected to an investigation into play using the device according to the disclosure. Subsequently, a play of 1 mm was introduced on the respective steering-assembly parts and these steering-assembly parts are again subjected to an investigation into play in order to verify if the play which was introduced could be detected (recorded). The results of the investigation are illustrated in the graphs shown in FIGS. 7 and 8. FIG. 7 shows the graph of the investigation into play performed on steering-assembly parts without play, while FIG. 8 shows the graph of the investigation into play performed on steering-assembly parts on which a play of 1 mm had been introduced beforehand. The X axis shows the position of the supporting plate (expressed in mm), while the Y axis shows the exerted (rotation) force, expressed in Newton. When both graphs are compared to each other, it can be seen that the play which was present (see the circled area in the graph from FIG. 8) can be recognised in the graph from FIG. 8.

The invention claimed is:

1. A device for detecting and identifying play and checking the attachment of wheel, steering-assembly and suspension parts of vehicles, comprising:
    a linearly displaceable carriage and a rotatable supporting plate which is configured to support a wheel of a vehicle,
    wherein the carriage is displaceable with respect to the supporting plate in a direction corresponding to a transverse direction of the vehicle,
    wherein the carriage comprises a rotatable structure which is provided to rotate the supporting plate about an axis of rotation,
    wherein the rotatable structure comprises a rotatable axle and a transmission mechanism configured to transmit rotating movement of the axle to the supporting plate (3),
    wherein the device further comprises:
    first and second guide mechanisms in which the carriage is linearly displaceable, wherein the first guide mechanisms are provided on a structure situated underneath and wherein the second guide mechanisms are provided on an underside of the supporting plate,
    wherein the transmission mechanism comprises a transmission element connected to the rotatable axle and at least one guide element which is provided on the transmission element and which is displaceable in the second guide mechanisms, and
    wherein the device comprises a first and second drive, wherein the first drive is configured to displace the carriage with respect to the supporting plate and wherein the second drive is configured to rotate the rotatable axle in a clockwise and/or counterclockwise direction.

2. The device according to claim 1, wherein the carriage is displaceable to a first position in which the rotatable structure is rotatable about a first axis of rotation which extends through the centre of the projection of a wheel on a support surface of the supporting plate.

3. The device according to claim 2, wherein the carriage is displaceable to a second position in which the rotatable structure is rotatable about a second axis of rotation which is eccentric with respect to the first axis of rotation.

4. The device according to claim 1, wherein the device comprises first measuring mechanisms to determine a rotation of the supporting plate, and second measuring mechanisms to measure generated rotation force, and wherein the device is configured to indicate play on the basis of signals generated by the measuring mechanisms.

5. The device according to claim 1, wherein the carriage comprises a 4-point bearing for supporting the rotatable structure.

6. The device according to claim 1, wherein the carriage comprises at least one guide profile which is displaceable in the first guide mechanism.

7. The device according to claim 1, wherein the guide element comprises a guide part configured to move linearly in the second guide mechanism, and comprises an engagement part which is configured to engage with the second guide mechanism, so that a rotation of the rotatable axle results in a rotation of the supporting plate.

8. The device according to claim 1, wherein the supporting plate comprises one or more pressure sensors to determine a position of a wheel.

9. Use of the device according to claim 1 in order to detect the play in one or more parts of wheel, steering assembly and suspension of one or more wheels of a vehicle and/or airplane.

10. A system for detecting and identifying play and checking the attachment of wheel, steering-assembly and suspension parts of vehicles, comprising:
    a first and a second device according to claim 1, wherein the supporting plate of the first device is configured to support a left-hand wheel of a vehicle, and wherein the supporting plate of the second device is configured to support a right-hand wheel of a vehicle.

\* \* \* \* \*